(No Model.)
E. J. McCLELLAN
Cake Stirrer.
No. 228,914.   Patented June 15, 1880.
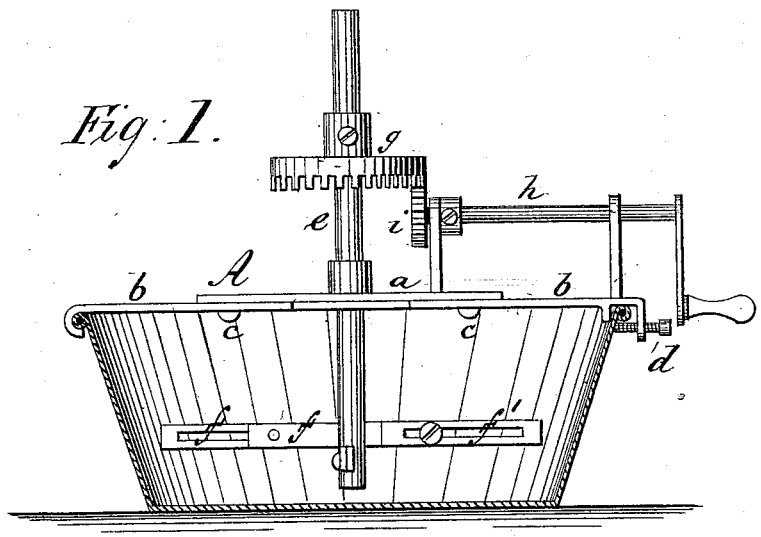
Fig. 1.
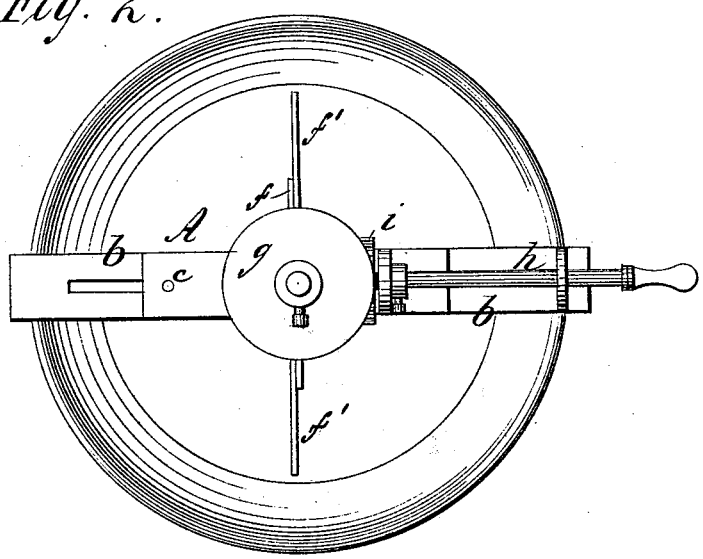
Fig. 2.
WITNESSES:
A. Schehl.
C. Sedgwick
Fig. 3.
INVENTOR:
E. J. McClellan
BY Munn & Co
ATTORNEYS.

UNITED STATES PATENT OFFICE.

EDWARD J. McCLELLAN, OF BROOKLYN, NEW YORK.

CAKE-STIRRER.

SPECIFICATION forming part of Letters Patent No. 228,914, dated June 15, 1880.

Application filed March 23, 1880. (No model.)

*To all whom it may concern:*

Be it known that I, EDWARD J. McCLELLAN, of Brooklyn, Kings county, and State of New York, have invented a new and useful Improvement in Cake-Stirrers, of which the following is a specification.

The object of my invention is to furnish a device that may readily be attached to a pan for use in mixing and kneading dough for bread and cake.

My invention consists in an adjustable bar or plate fitted with a clamping-screw and carrying the mixer and gearing; also, in the mixer, which consists of an arbor or staff provided with radial arms and fitted with eccentric gearing, whereby both a revolving motion and up-and-down movement may be given to the staff.

In the accompanying drawings, forming part of this specification, Figure 1 is a vertical section of a pan having my stirrer applied thereto. Fig. 2 is a plan view of the same, and Fig. 3 is a face view of the eccentric pinion.

Similar letters of reference indicate corresponding parts.

A is the supporting bar or plate of the mechanism, which bar is made in three pieces—a middle piece, $a$, and end pieces, $b\ b$, which are connected to the center piece by clamping-screws $c$, passing through slots, so that adjustment of length may be made at each end and the piece $a$ held over the center of the pan.

The outer ends of the pieces $b$ are formed with flanges, or hook-shaped, for setting over the rim of the pan, and at one end is a set-screw, $d$, by which the bar A can be clamped securely in place.

The center piece, $a$, of the bar A is formed with a tubular hub for the arbor or staff $e$, which staff is formed or fitted with radial arms or stirrers $f$ at its lower end, each of which arms is provided with an adjustable end piece, $f'$, attached by a screw, so that the length of the stirrers may be adjusted to the size of pan. Upon the upper end of staff $e$ is attached a pinion, $g$, and in standards projecting from bar A is fitted a horizontal shaft, $h$, which has upon its outer end a handle, and carries at its inner end an eccentric pinion, $i$, that engages with pinion $g$. The pinion $g$ rests upon and is supported by the pinion $i$. Consequently, as the shaft $h$ is turned, the staff $e$ is revolved, and at the same time a vertical reciprocation is given to it.

This combined movement of the stirring devices is most effective in thoroughly mixing and kneading the dough.

It will be seen that my improved cake-stirrer may be adjusted for and applied to any bread-pan of usual size.

The staff $e$ can be adjusted for the depth of pan by shifting the gear $g$.

Having thus described my invention, I claim as new and desire to secure by Letters Patent—

The cake-stirrer consisting of the staff $e$, provided with radial arms $f$, pinion $g$, shaft $h$, and eccentric pinion $i$, combined together and with the supporting-bar A substantially as shown and described.

EDWARD J. McCLELLAN.

Witnesses:
GEO. D. WALKER,
C. SEDGWICK.